(12) United States Patent
Valembois

(10) Patent No.: US 9,488,239 B2
(45) Date of Patent: Nov. 8, 2016

(54) SPRING DEVICE

(75) Inventor: Guy Valembois, Lauzerville (FR)

(73) Assignee: BORRELLY Spring Washers, Saint Laurent d'Agny (FR)

( * ) Notice: Subject to any disclaimer, the term of this patent is extended or adjusted under 35 U.S.C. 154(b) by 0 days.

(21) Appl. No.: 14/128,600

(22) PCT Filed: Jun. 22, 2012

(86) PCT No.: PCT/FR2012/051436
§ 371 (c)(1),
(2), (4) Date: Jan. 13, 2014

(87) PCT Pub. No.: WO2012/175892
PCT Pub. Date: Dec. 27, 2012

(65) Prior Publication Data
US 2014/0131931 A1 May 15, 2014

(30) Foreign Application Priority Data

Jun. 22, 2011 (FR) ...................................... 11 55480
Jul. 22, 2011 (FR) ...................................... 11 56680

(51) Int. Cl.
*F16F 1/373* (2006.01)
*F16F 1/32* (2006.01)
*F16F 1/02* (2006.01)

(52) U.S. Cl.
CPC ................ *F16F 1/373* (2013.01); *F16F 1/025* (2013.01); *F16F 1/32* (2013.01); *F16F 1/324* (2013.01)

(58) Field of Classification Search
CPC ............ F16F 1/373; F16F 1/32; F16F 1/324; F16F 1/025; F16F 1/371; F16F 1/377; F16F 1/3732
USPC ......................................................... 267/153
See application file for complete search history.

(56) References Cited

U.S. PATENT DOCUMENTS

| 3,578,305 A * | 5/1971 | Muelhauser .............. F16F 1/32 267/165 |
| 6,032,710 A * | 3/2000 | Milman .................... B60C 7/14 152/13 |
| 6,422,791 B1 | 7/2002 | Pallini et al. |
| 2002/0106485 A1* | 8/2002 | Monson .................. F16F 1/373 428/131 |
| 2003/0061977 A1* | 4/2003 | Malmberg ................ E02B 3/26 114/219 |
| 2003/0173724 A1* | 9/2003 | Jayakumaran .......... F16F 1/373 267/136 |
| 2005/0151310 A1* | 7/2005 | Rodeffer ................... F16F 1/32 267/161 |
| 2008/0116623 A1* | 5/2008 | Crocker .................... F16F 1/32 267/169 |
| 2008/0203633 A1* | 8/2008 | Koehler et al. .................. 267/70 |
| 2009/0126224 A1* | 5/2009 | Greene ................ A43B 13/206 36/27 |

(Continued)

FOREIGN PATENT DOCUMENTS

DE 29807170 U1 * 6/1998
EP 0132048 A1 1/1985

(Continued)

Primary Examiner — Robert A Siconolfi
Assistant Examiner — San Aung
(74) Attorney, Agent, or Firm — Andrew W. Chu; Craft Chu PLLC

(57) ABSTRACT

The spring device includes a part using the resilient properties of the material from which the part is made. There are at least two opposite points or areas, which are to be biased. The device includes, between the points or areas, an intermediate portion including a mesh structure resulting from the assembly of optionally rectilinear segments, at least two of which lie in separate planes, both outside of the direction of bias. During the biasing, one segment is longitudinally biased by compression and the other is longitudinally biased by pulling.

5 Claims, 3 Drawing Sheets

(56) References Cited

U.S. PATENT DOCUMENTS

2014/0330299 A1\* 11/2014 Rosenbluth ........ A61B 17/1214
606/191
2014/0343602 A1\* 11/2014 Cox ................... A61B 17/0057
606/215

FOREIGN PATENT DOCUMENTS

| EP | 1930049 B1 | 8/2010 |
| GB | 857611 A | 1/1961 |
| WO | 2009030017 A1 | 3/2009 |
| WO | WO2009/030017 \* | 3/2009 |

\* cited by examiner

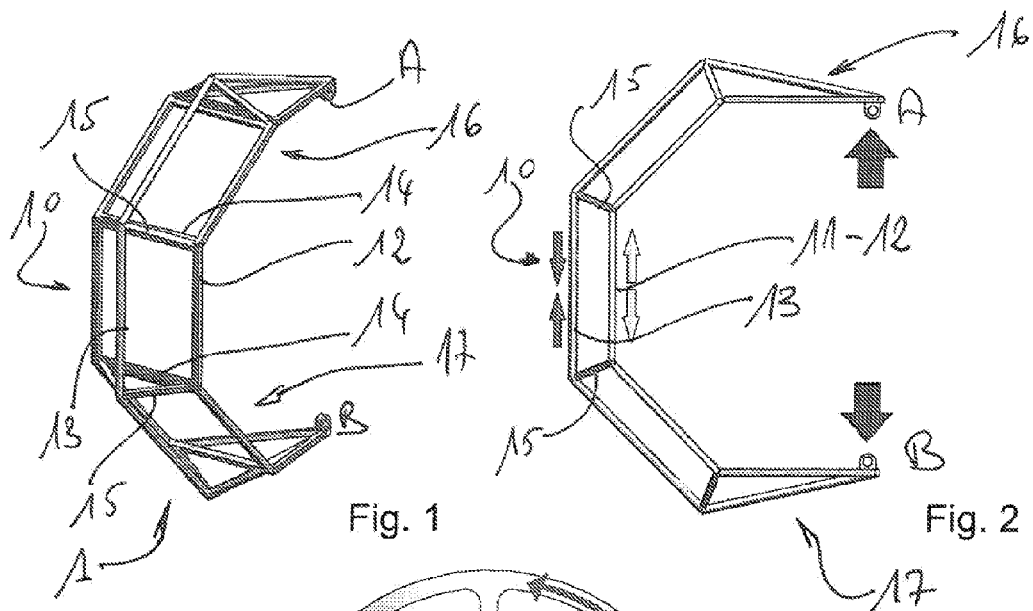
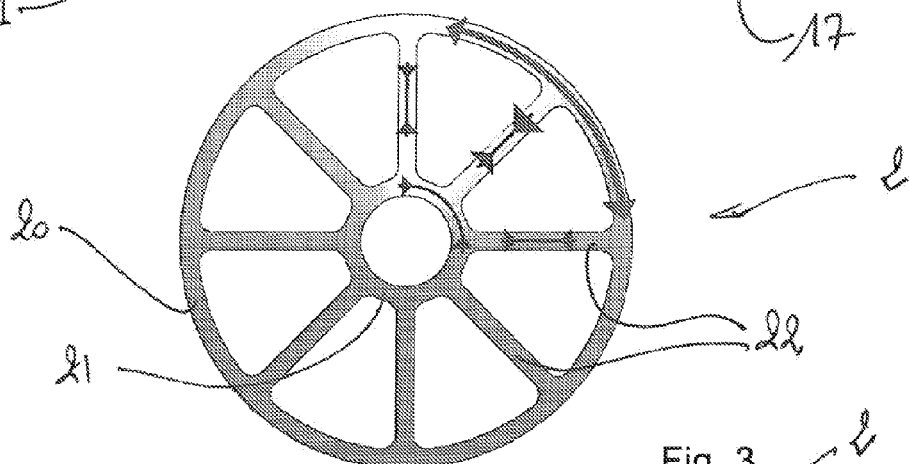
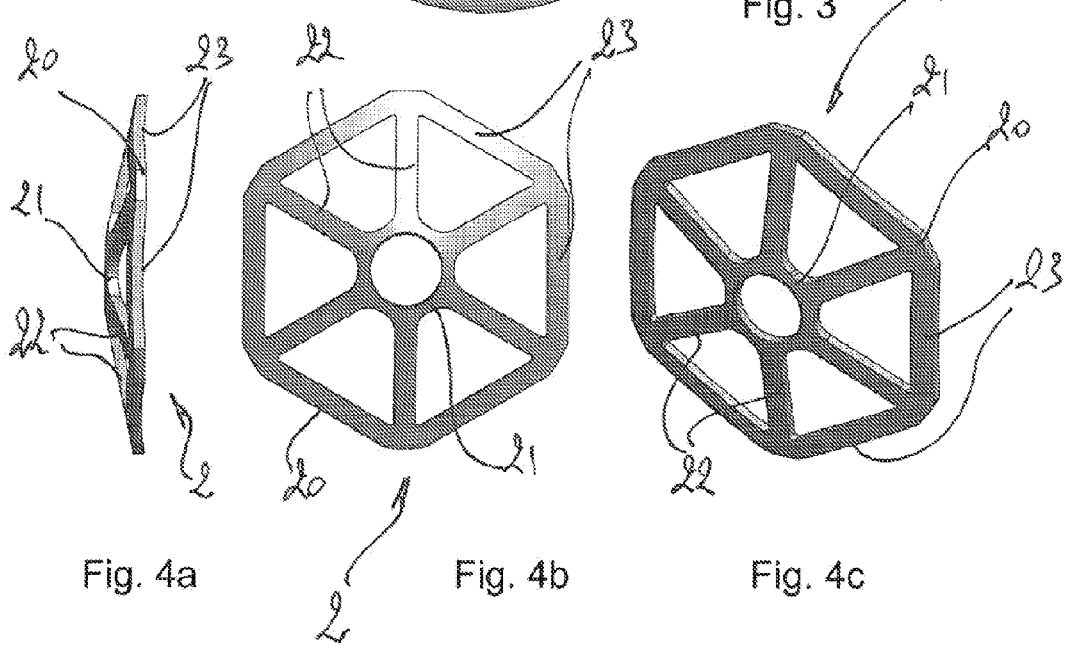
Fig. 1   Fig. 2
Fig. 3
Fig. 4a   Fig. 4b   Fig. 4c

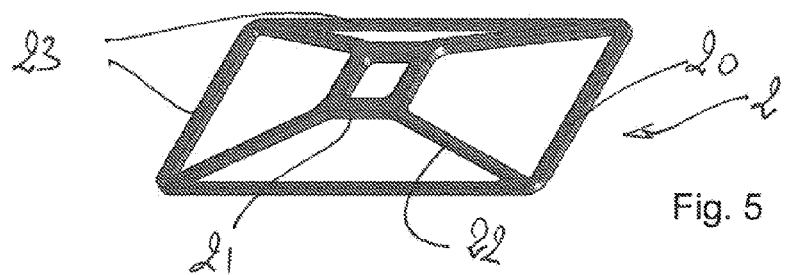
Fig. 5
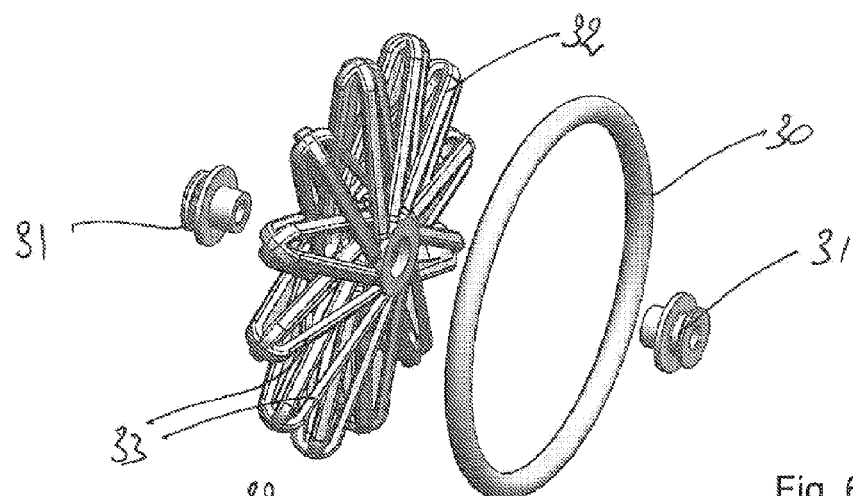
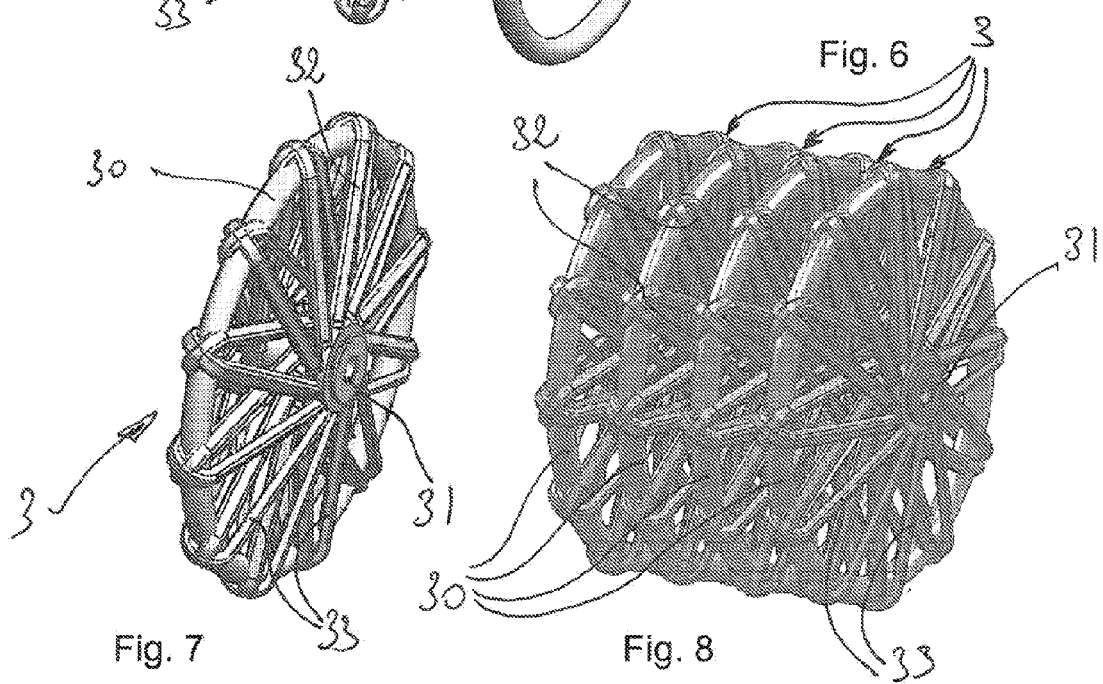
Fig. 7  Fig. 8

SPRING DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to an optimized spring device.

Generally, a spring is a part using the resilient properties of the material or materials, which it is made of, and which comprises at least two opposite points, or areas, to be subjected to external stresses.

2. Description of Related Art Including Information Disclosed Under 37 CFR 1.97 and 37 CFR 1.98

The difficulty in making spring devices using pure biases—in traction and compression—resides in the small displacement allowed by such biases.

One approach of a solution is outlined with so-called "Belleville" conventional washers, where the bias in compression-traction prevails, but in which is present a proportion of the bending in the part that is large enough to make the effectiveness of this type of spring insufficient in some applications.

However, these washers transform small deformations into large displacements, which is looked for in the springs, on the other hand, the distribution without bias in a BELLEVILLE washer is not uniform at all, which is prejudicial for its effectiveness.

Also known are spring devices formed of the assembly of at least two elements having different characteristics, namely rigid elements and resilient elements of the type made of elastomer, or shaped so as to be deformable, where said rigid elements react to a bias through said resilient elements. Such devices are disclosed in WO 2009/030 017, EP 0 132 048, EP 1 930 049 and U.S. Pat. No. 6,422,791.

SUMMARY OF THE INVENTION

The aim of the present invention is to cope with the various aforementioned drawbacks by providing a spring device permitting the joint use of the pure biases in traction and compression, while permitting significant displacements.

The spring device according to the invention consists of a part using the resilient properties of the material or materials, which it is made of, and which includes at least two opposite points, or areas, to be subjected to biases, and it is characterized in that it comprises, between said points or areas, an intermediate portion comprising a mesh structure resulting from the assembly of segments, whether rectilinear or not, at least two of which extend in different planes, and both outwardly with respect to the direction of the bias, so that during said biasing, one is biased longitudinally in compression and the other one longitudinally in traction.

According to an additional feature of the spring device according to the invention, the segments are made of different materials chosen according to whether they are intended to be biased in traction or compression.

According to a particular embodiment of the spring device according to the invention, it includes on the one hand at least two crowns extending in two different planes, one being of a diameter or transverse dimensions smaller than that or those of the other one, said crowns constituting two opposite areas to be subjected to biases, and on the other hand a plurality of connection segments connecting one crown to the other and forming with said crowns the mesh structure.

The spring device according to the invention thus has a generally conical shape.

When the spring device is subjected to a compression force, the outer crown—the largest one—is subjected to a stretch force, while the inner crown—the smallest one—is subjected to a compression force.

A suitable dimensioning permits to achieve a bias limit in traction in the outer crown identical to the compression force limit in the connection segments, as in the inner crown. This dimensioning permits the an optimal energy accumulation in the spring device.

It should be noted that in case the spring device according to the invention is made of composite material, taking into consideration that the composite materials have a tensile strength higher than that in compression, an inverse loading mode is preferred for that type of conical shape, i.e. ensuring that the external loading increases the conicity.

In this case of loading, the connection segments and the inner crown are subjected to bias in traction and the outer crown to bias in compression.

According to an additional feature of the device according to the invention, the outer crown is constituted by the succession of rectilinear segments extending between two neighboring connection segments.

According to a variant of the spring device according to the invention, it includes at least one crown of a large diameter, which consists of a ring, at least two crowns of a smaller diameter, which consist of coils coaxial to said ring and arranged on both sides of said ring, whereas the mesh structure consists of a lacing of one or more wire elements, extending from one coil to the other one while passing on the outer side of said ring, in order to form radial or substantially radial segments.

Advantageously, the wire element or elements are made of composite material.

According to another variant of the spring device according to the invention, it includes several crowns of a large diameter, which each consist of a ring, at least one crown of a smaller diameter, which consists of a ring coaxial to said rings of a large diameter and arranged between the latter, while the mesh structure consists of a lacing of one or several wire elements, which extend from one ring of a large diameter to another ring of a large diameter while passing inside said ring of a small diameter, while passing on the outer side of said rings of a large diameter, and securing ferrules, arranged at each end of the mesh structure, hold the ends of said wire elements and ensure the tension applied thereto.

According to another variant of the spring device according to the invention, the crowns consist of coaxial rings of large and small diameter arranged alternately, while the mesh structure consists of a tubular braid made of composite material passing externally on the ring or rings of a large diameter, and internally in the ring or rings of a smaller diameter, and securing ferrules arranged at each end of the mesh structure enclose the ends of said braid, so as to ensure the tension of said mesh structure.

The advantages and features of the spring device according to the invention will become clear from the following description, which refers to the attached drawing, which shows several non-restrictive embodiments.

BRIEF DESCRIPTION OF THE DRAWINGS

FIG. 1 shows a schematic perspective view of a first embodiment of the spring device according to the invention.

FIG. 2 shows a schematic elevation view of the same first embodiment.

FIG. 3 shows a schematic plan view of a second embodiment of the spring device according to the invention.

FIGS. 4a, 4b and 4c show schematic, respectively profile, plan and perspective views of a variant of the second embodiment.

FIG. 5 shows a schematic perspective view of another variant of the second embodiment.

FIG. 6 shows a schematic perspective and exploded view of a third embodiment of the spring device according to the invention.

FIG. 7 shows a schematic perspective view of the same third embodiment.

FIG. 8 shows a schematic perspective view of a variant of the same third embodiment.

DETAILED DESCRIPTION OF THE DRAWINGS

Figure 9:
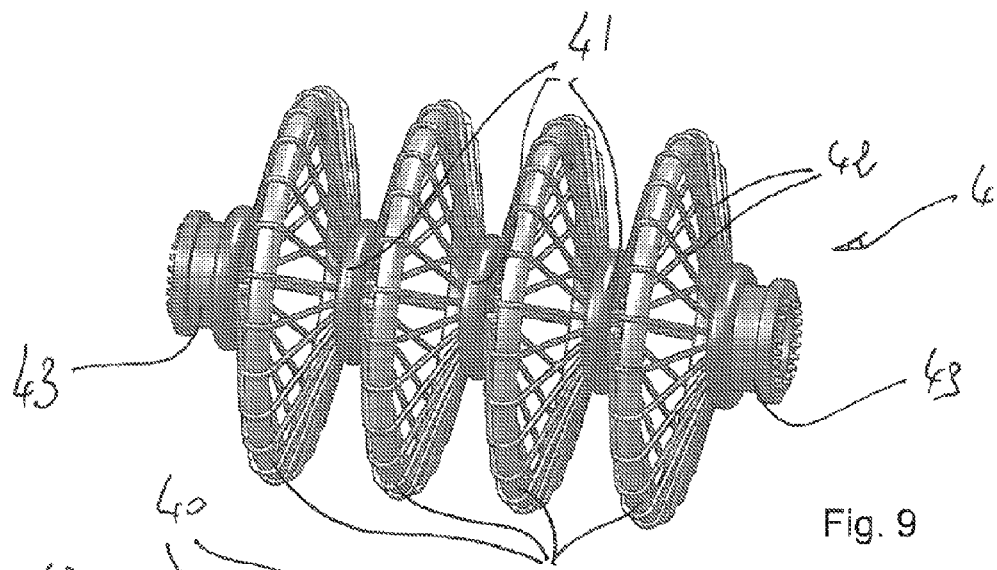
FIG. 9 shows a schematic perspective view of a fourth embodiment of the spring device according to the invention.

When referring to FIGS. 1 and 2, we can see a first embodiment of the spring device according to the invention, which consists of a structure 1 having a general C-shape, comprised of bars assembled so as to form a mesh. The mesh has fastening points A and B in order to permit the biasing of the mesh, which biasing is intended to be transformed into a traction or compression of the elementary bars of the mesh.

The structure 1 includes in its median region a portion 10 formed of the assembly of bars, in particular three parallel bars 11, 12 and 13. The bars 11 and 12 are connected by their ends by bars 14, so as to form therewith a quadrilateral, while the bar 13 extends in a plane different from the one containing this quadrilateral, and is connected thereto through oblique bars 15, so as to form triangles with the bars 14.

Furthermore, the plane containing the quadrilateral is interposed between the one containing the bar 13 and the line joining the fastening points A and B.

The portion 10 is connected to each of the two fastening points A and B through elements 16 and 17 each formed of an assembly of bars, the construction of which is identical to the portion 10, so that the bars 11 and 12 are connected directly to the points A and B, and that the bar 13 is also connected directly to the points A and B.

It will be understood that in the case of a bias in traction, i.e. a departure from each other of the fastening points A and B, as shown in FIG. 2, the latter is transmitted to the part 10 through the elements 16 and 17, which results into the bar 13 and all those elements 16 and 17 that connect the points A and B being subjected to compression forces, while the bars 11 and 12 and all those elements 16 and 17 that connect the points A and B are subjected to tensile forces.

In the case of a bias in compression, the bars are subjected to inverse forces.

Each bar has a cross-section adapted to have a uniform bias in traction or compression throughout the structure 1.

This feature allows to have a uniform local traction deformation for all the bars of the structure 1, as well as in compression.

The rate of compression deformation is not necessarily identical to the rate of deformation in compression because the materials used are not necessarily of the same performance in tension or in compression.

This differentiation may also be made per area or per bar when the mesh structure is made of parts of different materials.

Optimizing the mesh structure consists in optimizing the cross-sections so that the deformation of each bar is maximal in traction or in compression (in relation to the material constituting each bar) when the external stress is maximal.

When referring now to FIG. 3, we can see a second embodiment of the spring device according to the invention, which consists of a mesh structure in the form of a washer 2. This mesh washer 2 comprises two coaxial round crowns of different diameters and extending in different parallel planes, namely a crown of a larger diameter, referred to as outer crown 20, and a crown of a smaller diameter, referred to as inner crown 21, both crowns being connected by radial segments 22, thus forming recesses 23.

The mesh washer 2 has thus a globally conical shape, and its axial compression has the tendency to return it to its flat shape, resulting into the extension of the outer crown 20 and the compression of the inner crown 21 as well as the radial segments 21.

The recesses 23 permit to provide the part with a flexibility ensuring a very low participation of the flexion as a way of biasing. The biased areas are almost in pure traction or compression.

A judicious dimensioning permits to achieve a bias limit in traction in the outer crown 20 identical to the bias limit in compression in the radial segments 22, as in the inner crown 21. This dimensioning permits an optimal energy accumulation in the spring device.

The mesh washer 2 can be made of different materials, metal or the like. It can also be made of different materials, which are chosen based on their characteristics and the location of the segment.

Thus, the portions intended to be biased in traction can be made of metal, cables, ropes and other suitable materials for traction.

Though these portions intended to be biased in traction are made of composite materials comprising reinforcing fibers, they can be not locally or globally embedded in a resin, because the resin does not participate in the mechanical strength of the traction link.

Taking into consideration that the composite materials have a tensile strength higher than that in compression, an inverse loading mode is preferred for this type of conical shape, i.e. ensuring that the external load increases the conicity.

FIGS. 4a, 4b, 4c and 5 show variants of the mesh washer 2, in which the outer crown 20 is formed of a succession of rectilinear segments 23, which permits a putting under compression of this area if the number of radial segments 22 is small. This optimization can be conducted on the inner crown 21, but is less interesting.

When referring now to FIGS. 6 and 7, we can see a third embodiment of the spring device according to the invention, which consists of a mesh disc 3, comprising, as can be seen in FIG. 6, a ring 30, two coils 31, and a lacing 32 of composite material formed into segments 33 that extend radially or substantially radially between the coils 31 and the ring 30.

During manufacture, the coils 31 are closely spaced and arranged symmetrically and coaxially with respect to the compression ring 30, the whole being held in this position in order to permit the putting into place of the lace 32, the holding being ensured by means of a jig, a plastic part that will remain included in the spring, a mandrel made of metal having a low melting point, a piece of soluble foam or generally by means of any core traditionally used for making inner forms in molding.

The lacing 32 is obtained by winding composite fibers successively around each coil 31 while passing over the compression ring 30. The lacing 32 is made symmetrically, so as not to induce any torsion of the mesh disc 3 during biasing.

It will be understood that when the mesh disc 3 is biased in compression, i.e. when one tries to near the coils 30 to each other, the segments 33 are biased in compression, while when the mesh disc is biased in traction, i.e. when one tries to separate the coils 31 from each other, the segments 33 are biased in traction, and the ring in compression.

It should be noted that the coils 31 can be internally threaded, in order to permit the fastening of the mesh disk 3 to the external elements, with a view to a bias in traction.

When referring to FIG. 8, we can see several mesh discs 3 placed in series, however with, not necessarily, the removal of the discs between two mesh discs 3, the lacing 32 then passing from a compression ring 30 to the following compression ring 30, the coils 31 being reserved for reversing the direction of the lacing at the ends of the assembly.

When referring now to FIG. 9, we can see a fourth embodiment of the spring device according to the invention, which consists of a mesh structure 4 comprised of compression rings 40, traction rings 41 of a diameter smaller than that of the compression rings 40, and wire elements 42, such as snap rings, cables or fibers, as well as, at each end, a fastening ferrule 43 for the wire elements 42.

The compression rings 40 are juxtaposed coaxially, while the traction rings 41 are each interposed between two successive compression rings 40, coaxially to the latter. The wire elements 42 extend from one end to the other of the mesh structure 4, passing outside the compression rings 40 and inside the traction rings, their ends being held by the ferrules 43, which ensure the tension applied to these wire elements 42, and permitting the putting under load of the assembly : transmission of the external force to the wire elements through these ferrules 43.

The wire elements 42 extend radially between a compression ring 40 and a traction ring 41, taking together a conical shape.

A bias in traction of the mesh structure 4 causes the elongation of the wire elements 42, the reduction in diameter of the compression rings 40 and the increase in diameter of the traction rings 41.

These combined effects lead to the overall elongation of the mesh structure 4 by increasing the conical shape of the wire elements 42.

Such an architecture permits the use of different materials adapted to the different modes of biasing.

One can thus consider forming a spring having metallic portions and composite portions.

Figure 10:
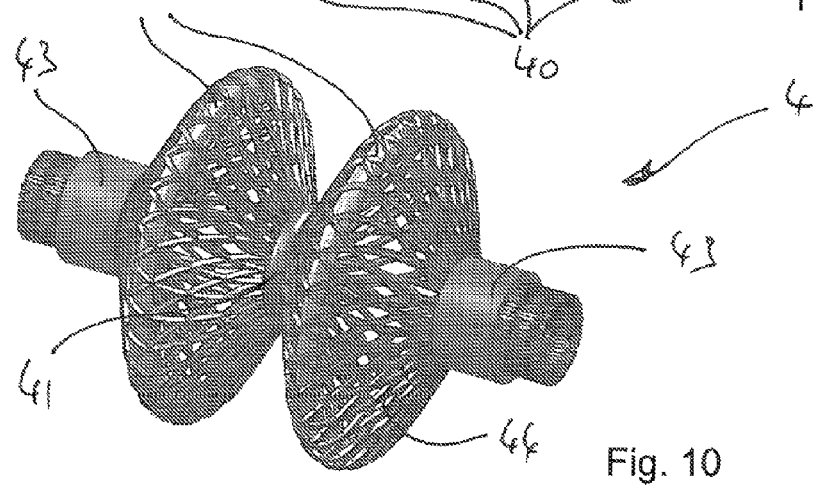
FIG. 10 shows a schematic perspective view of a fifth embodiment of the spring device according to the invention.
Figure 11:
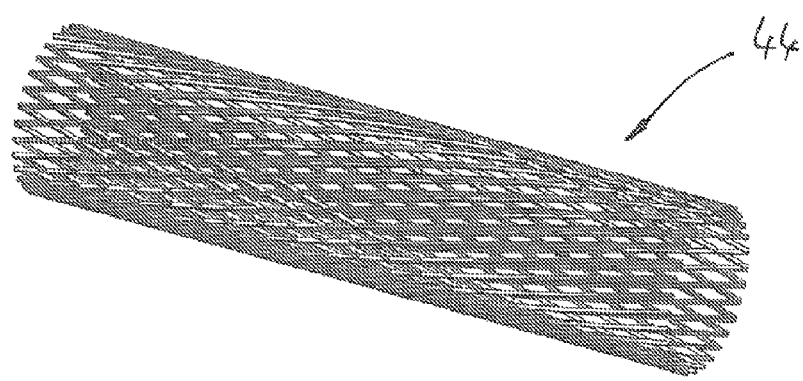
FIG. 11 shows a schematic perspective view of part of the same fifth embodiment.

When referring now to FIG. 10, we can see, a variant of the mesh structure 4, in which the wire elements 42 are replaced by a composite braid with a tubular shape 44, shown in FIG. 11, which exists as a semi-manufactured product, and is formed of an entanglement of fibers, of axial direction or slightly inclined with respect thereto, the ferrules 43 consisting of elements for enclosing the braid 44.

What is claimed:

1. A spring device, comprising:
   a part having resilient properties at least two opposite points subjected to biases;
   an intermediate portion, between the points, comprising a mesh structure comprised of an assembly of segments, at least two segments being extend in different planes, and both outwardly with respect to a direction of each bias, so that during biasing, one is biased longitudinally in compression and another one longitudinally in traction;
   at least two crowns extending in two different planes, one crown being of a diameter or transverse dimensions smaller than that or those of the other one, said crowns constituting two opposite areas to be subjected to biases, and a plurality of connection segments connecting one crown to the other and forming with the mesh structure with said crowns; and
   at least one crown of a large diameter, being comprised of a ring, and at least two crowns of a smaller diameter, having coils coaxial to said ring and arranged on both sides of said ring, wherein mesh structure comprises a lacing of one or more wire elements, extending from one coil to the other one while passing on the outer side of said ring, in order to form radial or substantially radial segments.

2. The spring device, according to claim 1, wherein the segments are comprised of different materials chosen according to whether a segment is intended to be biased in traction or compression.

3. The spring device according to claim 1, wherein the outer crown is comprised of the succession of rectilinear segments extending between two neighboring connection segments.

4. A spring device, comprising:
   a part having resilient properties at least two opposite points subjected to biases;
   an intermediate portion, between the points, comprising a mesh structure comprised of an assembly of segments, at least two segments being extend in different planes, and both outwardly with respect to a direction of each bias, so that during biasing, one is biased longitudinally in compression and another one longitudinally in traction;
   at least two crowns extending in two different planes, one crown being of a diameter or transverse dimensions smaller than that or those of the other one, said crowns constituting two opposite areas to be subjected to biases, and a plurality of connection segments connecting one crown to the other and forming the mesh structure with said crowns;
   several crowns of a large diameter, each crown being comprised of a ring; and
   at least one crown of a smaller diameter, being comprised of said ring coaxial to said rings of a large diameter and arranged between the latter, wherein mesh structure comprises a lacing of wire elements extending from one ring of a large diameter to another ring of a large diameter while passing inside said ring of a small diameter, while passing on the outer side of said rings of a large diameter, and securing ferrules, arranged at each end of the mesh structure, hold the ends of said wire elements and ensure the tension applied thereto.

5. A spring device, comprising:
a part having resilient properties at least two opposite points subjected to biases;
an intermediate portion, between the points, comprising a mesh structure comprised of an assembly of segments, at least two segments being extend in different planes, and both outwardly with respect to a direction of each bias, so that during biasing, one is biased longitudinally in compression and another one longitudinally in traction;
at least two crowns extending in two different planes, one crown being of a diameter or transverse dimensions smaller than that or those of the other one, said crowns constituting two opposite areas to be subjected to biases, and a plurality of connection segments connecting one crown to the other and forming the mesh structure with said crowns,
wherein the crowns comprise coaxial rings of a large and a small diameter arranged alternately, wherein mesh structure comprises a tubular braid of composite material passing externally on the ring or rings of a large diameter, and internally in the ring of a small diameter, and securing ferrules disposed at each end of the mesh structure enclose the ends of said braid, so ensure the tension of said mesh structure.

* * * * *